Patented Apr. 12, 1949

2,466,680

UNITED STATES PATENT OFFICE 2,466,680

2-(β-CARBOXYETHYL)-2-CYCLOHEXENYL CYCLOHEXANONE

Herman A. Bruson, Rydal, Pa., assignor, by mesne assignments, to Rohm & Haas Company, Philadelphia, Pa., a corporation of Delaware No Drawing. Application June 26, 1947, Serial No. 757,346

2 Claims. (Cl. 260—514)

1

This invention relates to 2-(β-carboxyethyl)-2-cyclohexenyl cyclohexanone having the formula

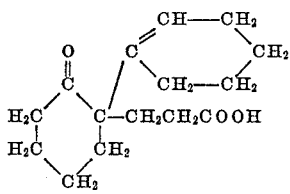

This new organic acid is useful intermediate for the preparation of vaso-constrictors, antispasmodics, and analgesics by reaction with various types of amino compounds. It is prepared from 2-cyclohexenyl cyclohexanone (Huckel et al., Ann., 477, 119 (1930)).

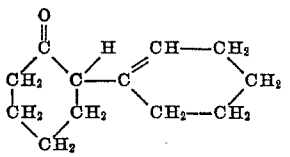

through a series of reactions, the first of which comprises reacting this compound with one mole of acrylonitrile in the presence of an alkaline condensing agent. Rather unexpectedly, this first mole of acrylonitrile adds at the =CH— group of the cyclohexenone ring. As a condensing agent, there may be used 1% to 10%, based on the weight of the cyclohexenyl cyclohexanone, of an alkali metal or an oxide, hydroxide, hydride, amide, or alcoholate thereof, or a strongly basic quaternary ammonium hydroxide, such as benzyl trimethyl ammonium hydroxide. The addition of acrylonitrile is performed at temperatures from 25° to 80° C., preferably at 25° to 50° C., with or without an inert organic solvent such as benzene, toluene, ether, dioxane, or tert.-butyl alcohol. The reaction mixture is acidified or neutralized with acid and the 2-(β-cyanoethyl)-2-cyclohexenyl cyclohexanone separated, as by distillation.

This product is then subjected to hydrolysis under the influence of a strong base to convert the nitrile group to a carboxylic group. Since a base is used, such as sodium or potassium hydroxide, the hydrolyzed product need be converted to the acid form with a strong inorganic acid and this form separated.

Alkaline hydrolysis is preferable, since in acid hydrolysis the amide group which is formed in the first step may react with the keto group to form a cyclohexyl heptahydroquinolone and the desired acid does not result in good yield.

2

A typical preparation of the new compound of this invention follows:

To a stirred mixture of one hundred grams of tert.-butyl alcohol, five grams of aqueous 40% benzyl trimethyl ammonium hydroxide, and 178 grams of 2-cyclohexenyl cyclohexanone, there is gradually added dropwise fifty-three grams of acrylonitrile during the course of thirty minutes. The exothermic reaction is maintained at 25°–35° C. by cooling. The mixture is thereafter stirred for about eight hours at room temperatuure and is then acidified with dilute hydrochloric acid until just blue to Congo red indicator. The mixture is then washed several times with water and the oil layer separated, dried, and distilled under reduced pressure at 0.2 mm.

The fraction boiling at 162°–172° C. (0.2 mm.) is collected. It amounts to 103 grams. Upon redistillation, it boils at 152°–156° C. (0.1 mm.) and solidifies to a white, crystalline solid when allowed to stand. This compound possesses the formula:

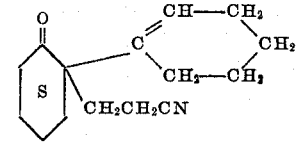

It crystallizes from petroleum ether in the form of white crystals which melt at 61°–62° C.

The above nitrile is converted to the acid which is the object of this invention by alkaline hydrolysis, as follows:

A mixture of 11.5 grams of 2-(β-cyanoethyl)-2-cyclohexenyl cyclohexanone, 11.5 grams of potassium hydroxide, and ninety grams of water is boiled under reflux with rapid stirring until an almost clear solution is formed. This requires about twenty hours, but the reaction can be hastened by adding alcohol to assist in dissolving the oil.

The filtered clear solution is acidified with dilute hydrochloric acid, and the taffy-like crude product which precipitates is taken up in benzene, washed, dried, and distilled under reduced pressure.

The 2-(β-carboxyethyl)-2-cyclohexenyl cyclohexanone boils at 175°–180° C. (0.2 mm.). It can be crystallized from petroleum ether and, when pure, forms white crystals which melt at 60°–61° C. A yield of nine grams was obtained. Upon analysis, this material contained 71.78% of carbon and 8.81% of hydrogen as compared with theoretical values for $C_{15}H_{22}O_3$ of 72.00% carbon and 8.80% hydrogen.

I claim:
1. As a new compound, 2-(β-carboxyethyl)-2-cyclohexenyl cyclohexanone having the formula

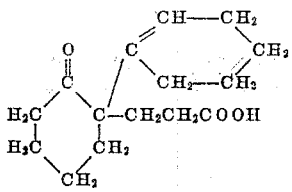

said compound, when pure, consisting of white crystals which melt at 60°–61° C.

2. A method for preparing 2-(β-carboxyethyl)-2-cyclohexenyl cyclohexanone which comprises reacting by addition in the presence of an alkaline condensing agent one mole of acrylonitrile and one mole of 2-cyclohexenyl cyclohexanone to form 2-(β-cyanoethyl)-2-cyclohexenyl cyclohexanone, hydrolyzing this compound with aqueous alkali, and converting the resulting alkali carboxylate to its acid form.

HERMAN A. BRUSON.

REFERENCES CITED

The following references are of record in the file of this patent:

UNITED STATES PATENTS

| Number | Name | Date |
|---|---|---|
| 2,394,962 | Bruson | Feb. 12, 1946 |